(12) United States Patent
Zhang et al.

(10) Patent No.: US 11,455,033 B2
(45) Date of Patent: Sep. 27, 2022

(54) METHOD FOR PERFORMING AUTOMATIC ADJUSTMENT AND OPTIMIZATION DISPLAY FOR VISIBLE AREA OF SCREEN

(71) Applicant: Samsung Electronics Co., Ltd., Suwon-si (KR)

(72) Inventors: Liangliang Zhang, Nanjing (CN); Fangqin Huang, Nanjing (CN); Yan Liu, Nanjing (CN); Junqing Ma, Nanjing (CN); Xiao Ling, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/028,093

(22) Filed: Sep. 22, 2020

(65) Prior Publication Data
US 2021/0116996 A1 Apr. 22, 2021

(30) Foreign Application Priority Data
Oct. 21, 2019 (CN) .......................... 201910999655.7

(51) Int. Cl.
| | |
|---|---|
| *G06F 3/13* | (2006.01) |
| *G06F 3/01* | (2006.01) |
| *H04N 13/368* | (2018.01) |
| *H04N 13/363* | (2018.01) |
| *G06F 3/04847* | (2022.01) |

(52) U.S. Cl.
CPC .......... *G06F 3/013* (2013.01); *G06F 3/04847* (2013.01); *H04N 13/363* (2018.05); *H04N 13/368* (2018.05)

(58) Field of Classification Search
CPC ....................................................... G06F 3/013
USPC ............................................................ 348/51
See application file for complete search history.

(56) References Cited

U.S. PATENT DOCUMENTS

| | | | |
|---|---|---|---|
| 9,704,216 B1* | 7/2017 | Laskar | A61B 3/0025 |
| 2012/0019438 A1* | 1/2012 | Liao | H04N 5/655 |
| | | | 345/156 |
| 2013/0057573 A1* | 3/2013 | Chakravarthula | G06F 3/005 |
| | | | 345/158 |
| 2013/0222633 A1* | 8/2013 | Knight | H04N 5/232945 |
| | | | 348/222.1 |

(Continued)

FOREIGN PATENT DOCUMENTS

| | | |
|---|---|---|
| CN | 104267816 A | 1/2015 |
| CN | 105528064 A | 4/2016 |
| CN | 108717366 A | 10/2018 |

OTHER PUBLICATIONS

Chinese Office Action dated Jul. 11, 2022, issued in Chinese Application 201910996557.

*Primary Examiner* — Daniel T Tekle
(74) *Attorney, Agent, or Firm* — Jefferson IP Law, LLP

(57) ABSTRACT

A device and a method for performing automatic adjustment and optimization display for a visible area of a screen is provided. The method includes determining position information of a viewer and the screen according to a face recognition algorithm, and determining an optimal visible area for the viewer according to a human eye view range algorithm, and adjusting a visible area of the screen according to the optimal visible area to obtain a size and layout of the visible area most suitable for viewing by the viewer.

12 Claims, 8 Drawing Sheets

(56) References Cited

U.S. PATENT DOCUMENTS

2013/0286049 A1* 10/2013 Yang ................... G09G 5/38
  345/649
2015/0070271 A1*  3/2015 Chen ................ G06F 1/1675
  345/156
2020/0356763 A1* 11/2020 Chen ................... G09G 3/20

* cited by examiner

METHOD FOR PERFORMING AUTOMATIC ADJUSTMENT AND OPTIMIZATION DISPLAY FOR VISIBLE AREA OF SCREEN

CROSS-REFERENCE TO RELATED APPLICATION(S)

This application is based on and claims priority under 35 U.S.C. § 119(a) of a Chinese patent application number 201910999655.7, filed on Oct. 21, 2019, in the Chinese Intellectual Property Office, the disclosure of which is incorporated by reference herein in its entirety.

BACKGROUND

1. Field

The application relates to the technical field of smart devices. More particularly, the disclosure relates to a method for performing automatic adjustment and optimization display for a visible area of a screen.

2. Description of Related Art

With the popularization of various electronic products, people have more and more requirements for the use comfort of electronic products and the friendly convenience of human-computer interaction. However, in real life, there are still some scenarios in which people feel less comfortable experiences, less friendly human-computer interactions and less convenient operations.

For example, a large-screen electronic device, such as Samsung "The Wall Television (TV)", has a large display screen. However, there may be following problems in a process of using the electronic device by users.

If the users are closer to the electronic device, the users may be unable to see the entire screen, but only able to see a small part of the screen, which reduces the viewing experiences of the users.

Further, the size of a menu user interface (UI) is usually designed in proportion to the actual size of the screen. If the screen is large, the entire menu UI is also large. It is difficult for the users to use touch operations at a close range, and even the users cannot reach the top menu, which greatly reduces the experiences of human-computer interaction.

For the above problems, the split-screen design of the related art simply divides the screen into two or four screens, which is relatively monotonous and is difficult to meet the users' requirements for diverse use environments and for comfortable and convenient use. The size and layout of the UI in products of the related art are usually unchangeable after being determined, cannot change with the change of user's position, and thus cannot always provide the most convenient operations for the user. In addition, if rendering is not enhanced in a focused area of the user, the viewing experiences of the user are poor. If high-quality rendering is performed directly in the entire screen to improve the viewing quality, it will be inevitably caused that useless rendering is performed in the remaining large non-focused area of the user, thereby increasing costs.

No product in the prior art can meet all the above requirements. To sum up, there is a need to provide a technical solution that can adaptively adjust the screen, and the size and layout of the UI according to the viewing environment of users, and can automatically perform optimization display.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for performing automatic adjustment and optimization display for a visible area of a screen, so as to improve the viewing experiences and comfort when a user uses an electronic device with a screen.

Additional aspects will be set forth in part in the description which follows and, in part, will be apparent from the description, or may be learned by practice of the presented embodiments.

In accordance with an aspect of the disclosure, a method for performing automatic adjustment and optimization display for a visible area of a screen is provided. The method includes determining position information of a viewer and the screen according to a face recognition algorithm, and determining an optimal visible area for the viewer according to a human eye view range algorithm, and adjusting a visible area of the screen according to the optimal visible area to obtain a size and layout of the visible area most suitable for viewing by the viewer.

Preferably, the determining position information of a viewer and the screen according to a face recognition algorithm, and determining an optimal visible area for the viewer according to a human eye view range algorithm includes determining, according to the face recognition algorithm, whether a single viewer is viewing the screen, at least two viewers are viewing the screen in a centralized position, or at least two viewers are viewing the screen in scattered positions, for a scenario where the at least two viewers are viewing the screen in the centralized position, positioning the centralized position of the at least two viewers, and determining the optimal visible area according to the positioned centralized position, and for a scenario where at least two viewers are viewing the screen in the scattered positions, splitting the screen, so that each viewer corresponds to respective split screen, and determining an optimal visible area in each split screen for a viewer corresponding to the split screen.

Preferably, the method further includes playing same or different contents in the different split screens, and distinguishing sounds of the different contents through different sound playback devices.

Preferably, the method further includes determining a display position and layout of a user interface (UI) in the visible area according to the size and layout of the visible area, so that the UI is suitable for operations by the viewer.

Preferably, the method further includes adjusting the display position and layout of the UI according to position movement of the viewer, so that the UI is suitable for operations by the viewer.

Preferably, the method further includes for different viewers, saving an optimal distance between each viewer and the screen, and size and layout information of the screen, when it is recognized that the viewer is viewing the screen, recommending the optimal distance, and the size and layout information of the screen that correspond to the viewer to the viewer according to the saved information.

Preferably, the method further includes adjusting the size and layout of the visible area according to position movement of the viewer, so that the visible area is suitable for viewing by the viewer.

Preferably, for the scenario where the at least two viewers are viewing the screen, when the position movement of the viewer causes overlap of visible areas of different viewers, at least one of following modes is performed when a first viewer moves to a second viewer and the second viewer remains still, a split screen corresponding to the second viewer keeps display, and a split screen corresponding to the first viewer disappears on the screen, when the first viewer moves to the second viewer, and the second viewer moves to the first viewer, a split screen corresponding to slower moving one among the first viewer and the second viewer keeps display, and a size and layout of the split screen keeping display is adjusted through taking the first viewer and the second viewer as the scenario where the at least two viewers are viewing the screen in the centralized position.

Preferably, the method further includes obtaining a focused area of the viewer in the screen according to a human eye focusing algorithm, enhancing rendering quality in the focused area of the viewer, and reducing the rendering quality in a non-focused area of the viewer.

In accordance with another aspect of the disclosure, a device for performing automatic adjustment and optimization display for a visible area of a screen is provided. The device includes a recognizing and positioning system and a visible area controlling system, wherein the recognizing and positioning system is configured to determine position information of a viewer and the screen according to a face recognition algorithm, and determine an optimal visible area for the viewer according to a human eye view range algorithm, and the visible area controlling system is configured to adjust a visible area of the screen according to the optimal visible area determined by the recognizing and positioning system to obtain a size and layout of the visible area most suitable for viewing by the viewer.

Preferably, the recognizing and positioning system includes at least one of following device a single-target positioning device, configured to determine a face and position information of a single target viewer according to the face recognition algorithm, determine an optimal visible area for the single target viewer according to the human eye view range algorithm, and provide the determined optimal visible area to the visible area controlling system, a centralized multi-target positioning device, configured to recognize at least two target viewers according to the face recognition algorithm, taking the at least two target viewers as a whole target, performing centralized recognition and positioning according to faces of the at least two target viewers in the whole target, determine an optimal visible area for the at least two target viewers according to the human eye view range algorithm, and provide the determined optimal visible area to the visible area controlling system, a scattered multi-target positioning device, configured to recognize at least two target viewers according to the face recognition algorithm, determine the at least two target viewers as scattered target viewers, performing processing of the single-target positioning device and the centralized multi-target positioning device for each target viewer, and provide a processing result to the visible area controlling system, and a focused area recognizing device, configured to obtain a focused area of the target viewer according to a human eye focusing algorithm, and provide a result to the visible area controlling system.

Preferably, the visible area controlling system includes at least one of following device a follow-up playing area device, configured to play in the visible area, and adjust the size and layout of the visible area according to the information provided by the recognizing and positioning system, so that the visible area is suitable for viewing by the viewer, a follow-up user interface (UI) menu device, configured to display an UI in the visible area, adjust a display position and layout of the UI according to the information provided by the recognizing and positioning system, so that the UI is suitable for operations by the viewer, a picture enhancing area device, configured to enhance rendering quality in a focused area of the viewer according to the information provided by the recognizing and positioning system, a picture reducing area device, configured to reduce the rendering quality in a non-focused area of the viewer according to the information provided by the recognizing and positioning system, and a screen splitting device, configured to split the screen according to the information provided by the recognizing and positioning system, so that each viewer corresponds to respective split screen, and determine an optimal visible area in each split screen for a viewer corresponding to the split screen.

In accordance with another aspect of the disclosure, the technical solutions are provided. The technical solutions have the following merits 1. The size of user visible range is fully considered in the disclosure, so the optimum viewing experiences can always be provided for users.

2. The user's position information is fully utilized in the disclosure, the size of the user's visible area is obtained according to the face and human eye algorithm, and the size and layout of the UI is adjusted according to the size of the visible area. Further, since the UI has a follow-up characteristic, the disclosure always presents the menu UI to be operated by the user in front of the user according to the movement of the user's position, thereby greatly improving the human-machine interaction.

3. The disclosure makes full use of the optimal viewing and operating ratio between the user and the interface, and recommends different optimal viewing distances, sizes and layouts for different users on the same device.

4. The disclosure fully considers screen rendering costs. By recognizing an area focused by the user's eyes, the size of the focused area of the user is obtained. The rendering quality is enhanced for the picture in the focused area, while the rendering quality is reduced in the remaining area. By this technology, not only the picture quality in the focused area of the user can be improved, but also the overall rendering costs can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In order to make the object, technical solution and merits of the application clearer, the application will be illustrated hereinafter with reference to the accompanying drawings and embodiments.

In the process of implementing the disclosure, the inventor mainly improves the technologies of the related art based on the following technical problems:

1. how to distinguish one viewer, concentrated multiple viewers and scattered multiple viewers, and accurately recognize and position them.

2. how to ensure that a visible area, a UI and layout thereof always follow a viewer and are adjusted adaptively.

3. screen splitting processing is performed when multiple viewers view the screen, and thus how to deal with a problem of fusion of multiple screens during a follow-up process.

In order to address the above technical issues, the application proposes a method for performing automatic adjustment and optimization display for a visible area of a screen. In the method, based on face recognition, human eye recognition and position positioning, the size of the visible area, and the size and layout of the UI are adjusted automatically, and the visible area and the UI are displayed optimally. Specifically, the method of the disclosure includes the following operations.

Figure 1:
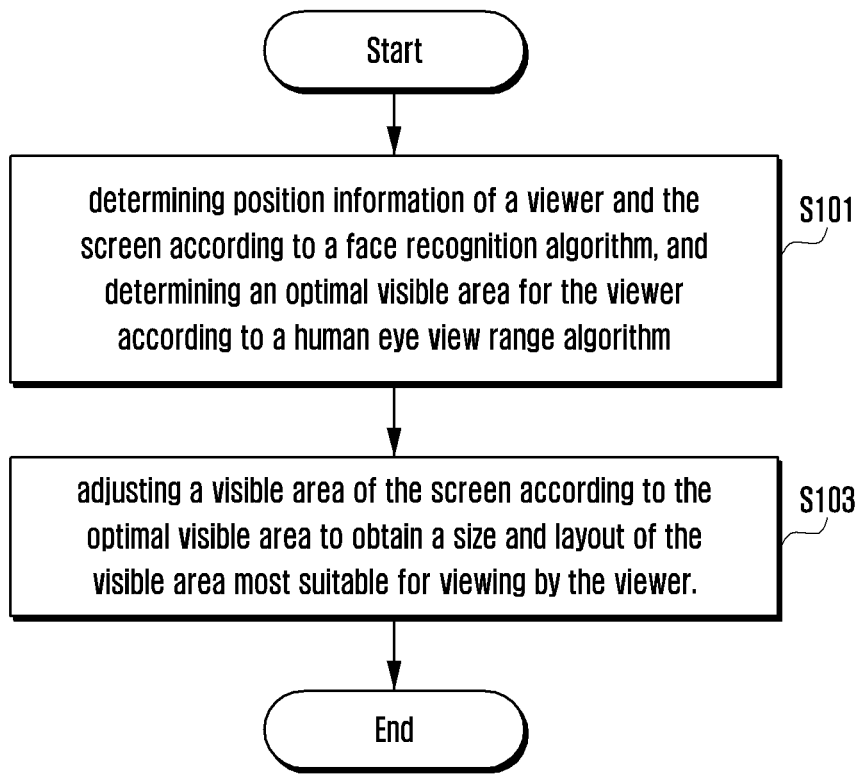
FIG. 1 is a diagram of a method for performing automatic adjustment and optimization display for a visible area of a screen according to an embodiment of the disclosure.

FIG. 1 is a diagram of a method for performing automatic adjustment and optimization display for a visible area of a screen according to an embodiment of the disclosure.

Referring to FIG. 1, in operation S101, the position information of a viewer and a screen is determined according to a face recognition algorithm, and an optimal visible area is determined for the viewer according to a human eye view range algorithm.

In operation S103, a visible area of the screen is adjusted according to the determined optimal visible area to obtain a size and layout of the visible area most suitable for viewing by the viewer. In this way, it can be ensured that the entire visible area is always within a human eye view range, thereby improving user viewing experiences.

The determining position information of a viewer and the screen according to a face recognition algorithm, and determining an optimal visible area for the viewer according to a human eye view range algorithm includes determining, according to the face recognition algorithm, whether a single viewer is viewing the screen, at least two viewers are viewing the screen in a centralized position, or at least two viewers are viewing the screen in scattered positions, for a scenario where the at least two viewers are viewing the screen in the centralized position, positioning the centralized position of the at least two viewers, and determining the optimal visible area according to the positioned centralized position, and for a scenario where at least two viewers are viewing the screen in the scattered positions, splitting the screen, so that each viewer corresponds to respective split screen, and determining an optimal visible area in each split screen for a viewer corresponding to the split screen; playing same or different contents in the different split screens, and distinguishing sounds of the different contents through different sound playback devices.

Based on the above solutions, the disclosure also provides an enhanced technical solution from the following aspects, so that the technical solutions of the disclosure can achieve better technical effects.

A. An operation menu (i.e., a user interface (UI)) is adjusted according to the size of the screen and the layout of the UI is adjusted to improve the experiences of human-computer interaction. Specifically, a display position and layout of the UI in the visible area are determined according to the size and layout of the visible area, so that the UI is suitable for operations by a corresponding viewer.

B. A visible area of a device and a position of UI are adjusted according to the position movement of a user, so that the UI has a follow-up characteristic, which specifically includes adjusting the display position and layout of the UI according to the position movement of the viewer, so that the UI is suitable for the operations by the viewer, and adjusting the size and layout of the visible area according to the position movement of the viewer, so that the visible area is suitable for viewing by the viewer.

C. A focused area of the viewer in the screen is obtained according to a human eye focusing algorithm, rendering quality is enhanced in the focused area of the viewer, and the rendering quality is reduced in a non-focused area of the viewer. In this way, not only the user experiences can be enhanced, but also the overall screen rendering costs can be reduced.

D. An optimal viewing and operating ratio between a user and the screen is recorded, and respective recommendations are given to different users when the device is started next time, so that the user can directly enter an optimal viewing and operating mode. Specifically, for different viewers, an optimal distance between each viewer and the screen, and the size and layout information of the screen are saved; when it is recognized that the viewer is viewing the screen, the optimal distance corresponding to the viewer, and the size and layout information of the screen are recommended to the viewer according to the saved information.

E. In the scenario where there are at least two viewers, when the position movement of a viewer causes overlap of visible areas of different viewers, at least one of the following processing methods may be performed.

When a first viewer moves to a second viewer and the second viewer remains still, a split screen corresponding to the second viewer keeps display, and a split screen corresponding to the first viewer disappears on the screen.

When the first viewer moves to the second viewer, and the second viewer moves to the first viewer, a split screen corresponding to slower moving one among the first viewer and the second viewer keeps display, and a size and layout of the split screen keeping display is adjusted through taking the first viewer and the second viewer as the scenario where the at least two viewers are viewing the screen in the centralized position.

Corresponding to the above method, the application also provides a device for performing automatic adjustment and optimization display for a visible area of a screen. The device includes: a recognizing and positioning system and a visible area controlling system.

The recognizing and positioning system is configured to determine an optimal visible area for a viewer according to a face recognition algorithm and position information of the viewer and the screen.

The visible area controlling system is configured to adjust a visible area of the screen according to the optimal visible area determined by the recognizing and positioning system to obtain a size and layout of the visible area most suitable for viewing by the viewer.

Figure 2:
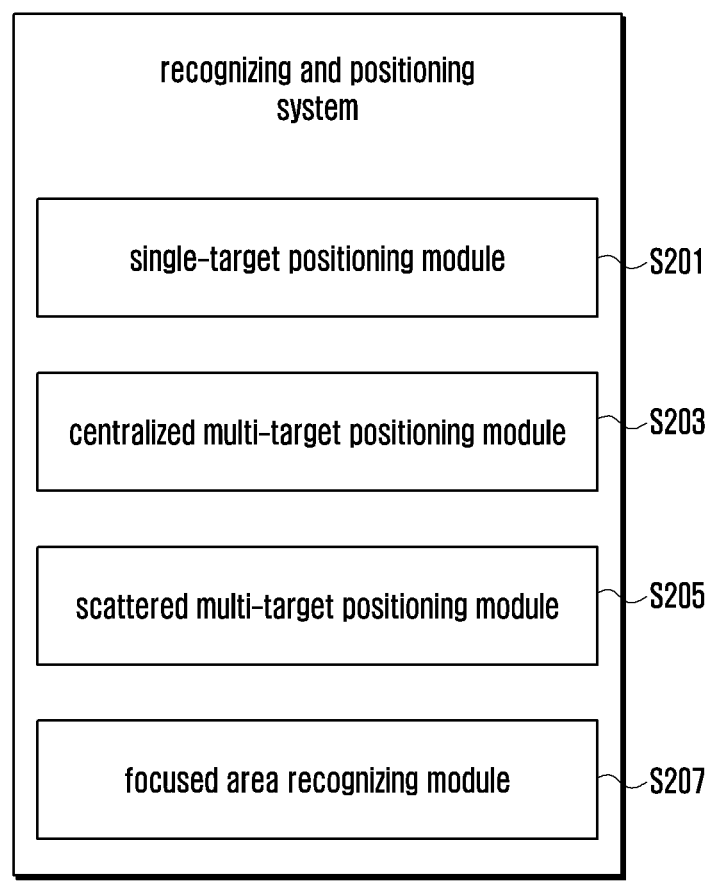
FIG. 2 is a diagram of a module composition of a recognizing and positioning system in a device according to an embodiment of the disclosure.

FIG. 2 is a diagram of a module composition of a recognizing and positioning system in a device according to an embodiment of the disclosure.

Referring to FIG. 2, the module composition of the recognizing and positioning system in the device of the disclosure is shown, and specifically includes at least one of the following modules:

In operation S201, a single-target positioning module, configured to determine a face and position information of a single target viewer according to the face recognition algorithm, determine an optimal visible area for the single target viewer according to a human eye view range algorithm, and provide the determined optimal visible area to the visible area controlling system;

In operation S203, a centralized multi-target positioning module, configured to recognize at least two target viewers according to the face recognition algorithm, taking the at least two target viewers as a whole target, performing centralized recognition and positioning according to faces of the at least two target viewers in the whole target, determine an optimal visible area for the at least two target viewers according to the human eye view range algorithm, and provide the determined optimal visible area to the visible area controlling system;

In operation S205, a scattered multi-target positioning module, configured to recognize at least two target viewers according to the face recognition algorithm, determine the at least two target viewers as scattered target viewers, performing processing of the single-target positioning module and the centralized multi-target positioning module for each target viewer, and provide a processing result to the visible area controlling system; and In operation S207, a focused area recognizing module, configured to obtain a focused area of the target viewer according to a human eye focusing algorithm, and provide a result to the visible area controlling system.

Figure 3:
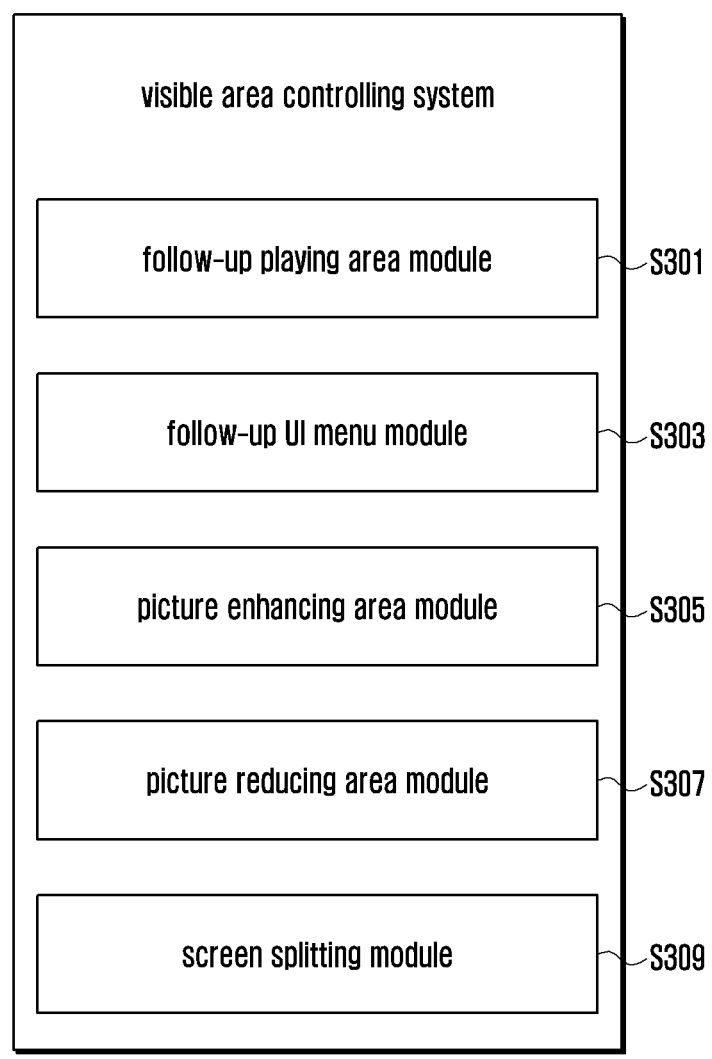
FIG. 3 is a diagram of a module composition of a visible area controlling system in a device according to an embodiment of the disclosure.

FIG. 3 is a diagram of a module composition of a visible area controlling system in a device according to an embodiment of the disclosure.

Referring to FIG. 3, the module composition of the visible area controlling system in the device of the disclosure is shown, and specifically includes at least one of the following modules:

In operation S301, a follow-up playing area module, configured to play in the visible area, and adjust the size and layout of the visible area according to the information provided by the recognizing and positioning system, so that the visible area is suitable for viewing by the viewer;

In operation S303, a follow-up UI menu module, configured to display an UI in the visible area, adjust a display position and layout of the UI according to the information provided by the recognizing and positioning system, so that the UI is suitable for operations by the viewer;

In operation S305, a picture enhancing area module, configured to enhance rendering quality in a focused area of the viewer according to the information provided by the recognizing and positioning system;

In operation S307, a picture reducing area module, configured to reduce the rendering quality in a non-focused area of the viewer according to the information provided by the recognizing and positioning system; and In operation S309, a screen splitting module, configured to split the screen according to the information provided by the recognizing and positioning system, so that each viewer corresponds to respective split screen, and determine an optimal visible area in each split screen for a viewer corresponding to the split screen.

The technical solutions provided by the disclosure will be further described below with reference to several preferred embodiments.

A First Embodiment

Figure 4:
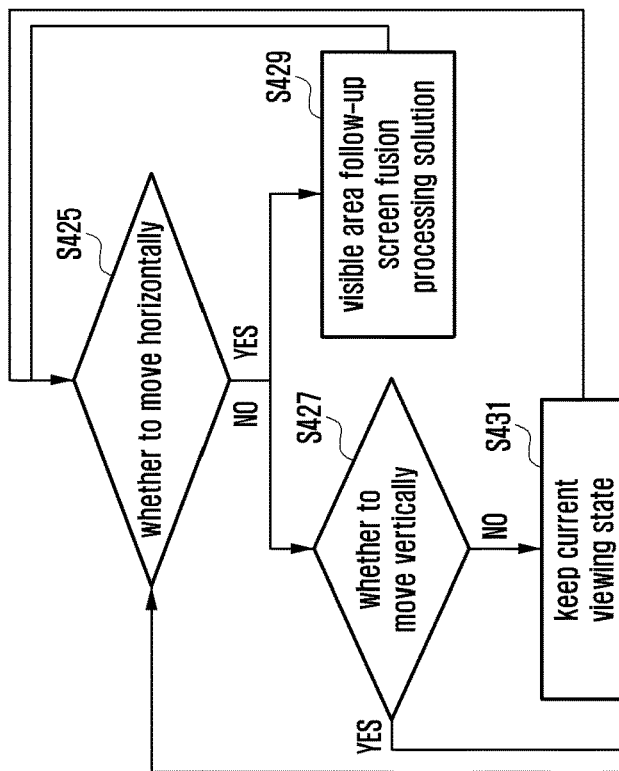
FIG. 4 is a diagram of a method for performing automatic adjustment and optimization display for a visible area of a screen according to an embodiment of the disclosure.
Figure 4:
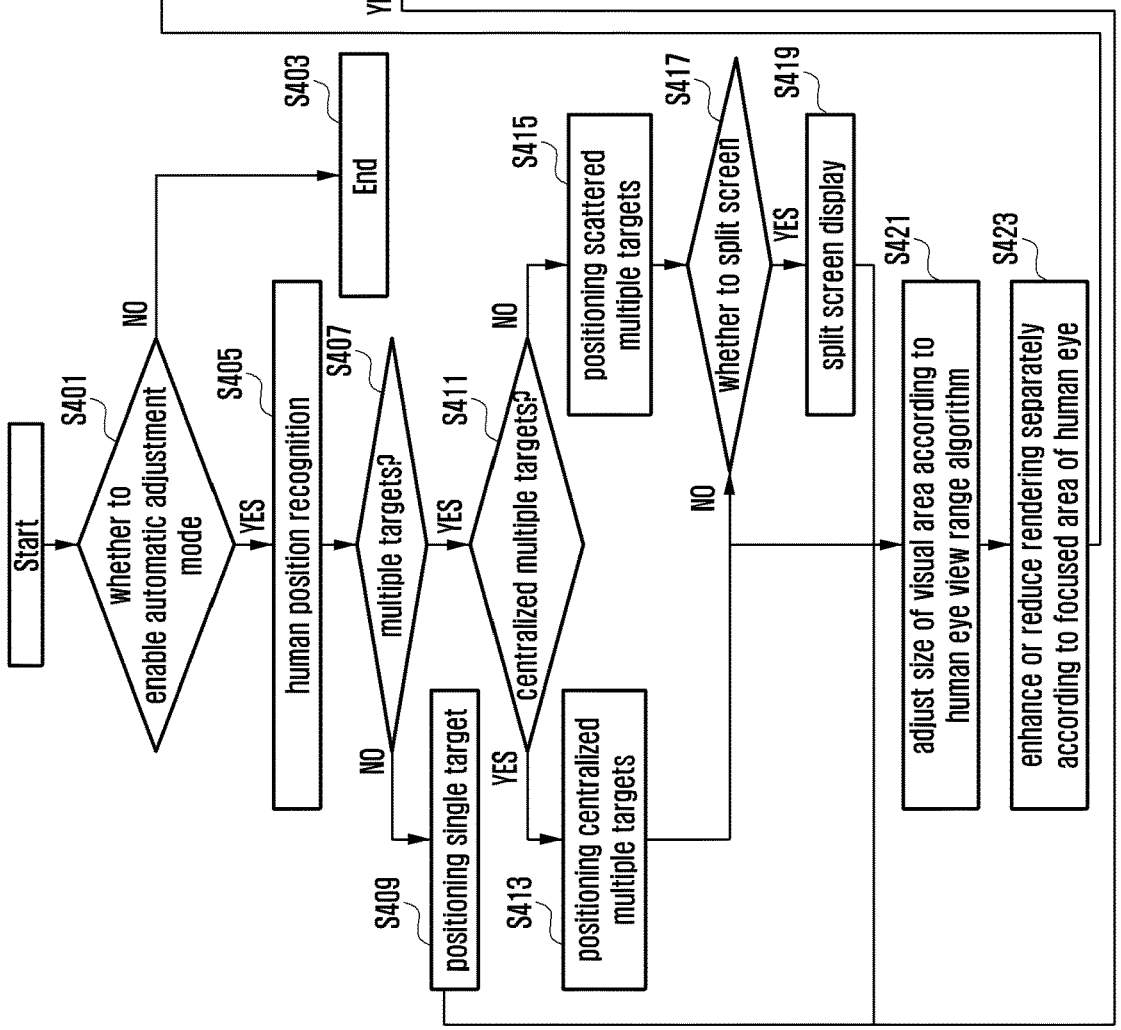

The implementation process of this embodiment is shown in FIG. 4 and includes the following operations.

FIG. 4 is a diagram of a method for performing automatic adjustment and optimization display for a visible area of a screen according to an embodiment of the disclosure.

Referring to FIG. 4, in operation S401, it is determined whether an automatic adjustment mode is enabled. If it is not enabled, terminate this process in operation S403; otherwise, proceed to operation S405.

Operation S405, human position is recognized.

Operation S407, it is determined whether a current scenario has multiple target viewers. If it is determined in operation S407 that the current scenario does not have multiple target viewers, a single target is positioned in operation S409. However, if it is determined in operation S407 that the current scenario has multiple target viewers, the operation continues to operation S411 to determine centralized multi-target positioning for the scenario of centralized multiple target viewers. If it is determined in operation S411 that the current scenario has centralized multiple target, the operation continues to operation S413 to perform centralized multi-target positioning. However, if it is determined in operation S411 that the current scenario does not have centralized multiple target, the operation continues to operation S415 to perform scattered multi-target positioning for the scenario of scattered multiple target viewers. Thereafter, it is determined in operation S417 whether the screen needs to be split, and when the screen needs to be split, processing related to screen splitting and displaying is performed in operation S419.

In operation S421, the size of the visible area is adjusted according to the human eye view range algorithm.

In operation S423, rendering is enhanced or reduced for different areas according to an area focused by human eyes.

In operation S425, it is determined whether a viewer moves horizontally. If the viewer moves horizontally, follow-up processing is performed in operation S429 for the visible area, the screen fusion processing strategy described above is adopted to perform corresponding processing, and the determining of this operation is continued. If the viewer does not move horizontally, operation S425 is performed.

In operation S427, it is determined whether the viewer moves vertically. If the viewer moves vertically, operation S409 is performed; otherwise, a current viewing state is kept in operation S431 and operation S425 is returned to.

A second embodiment: a solution for performing automatic adjustment, follow-up processing, screen splitting and screen overlay processing for a visible area of a large TV (such as Samsung "The Wall TV").

Figure 5:
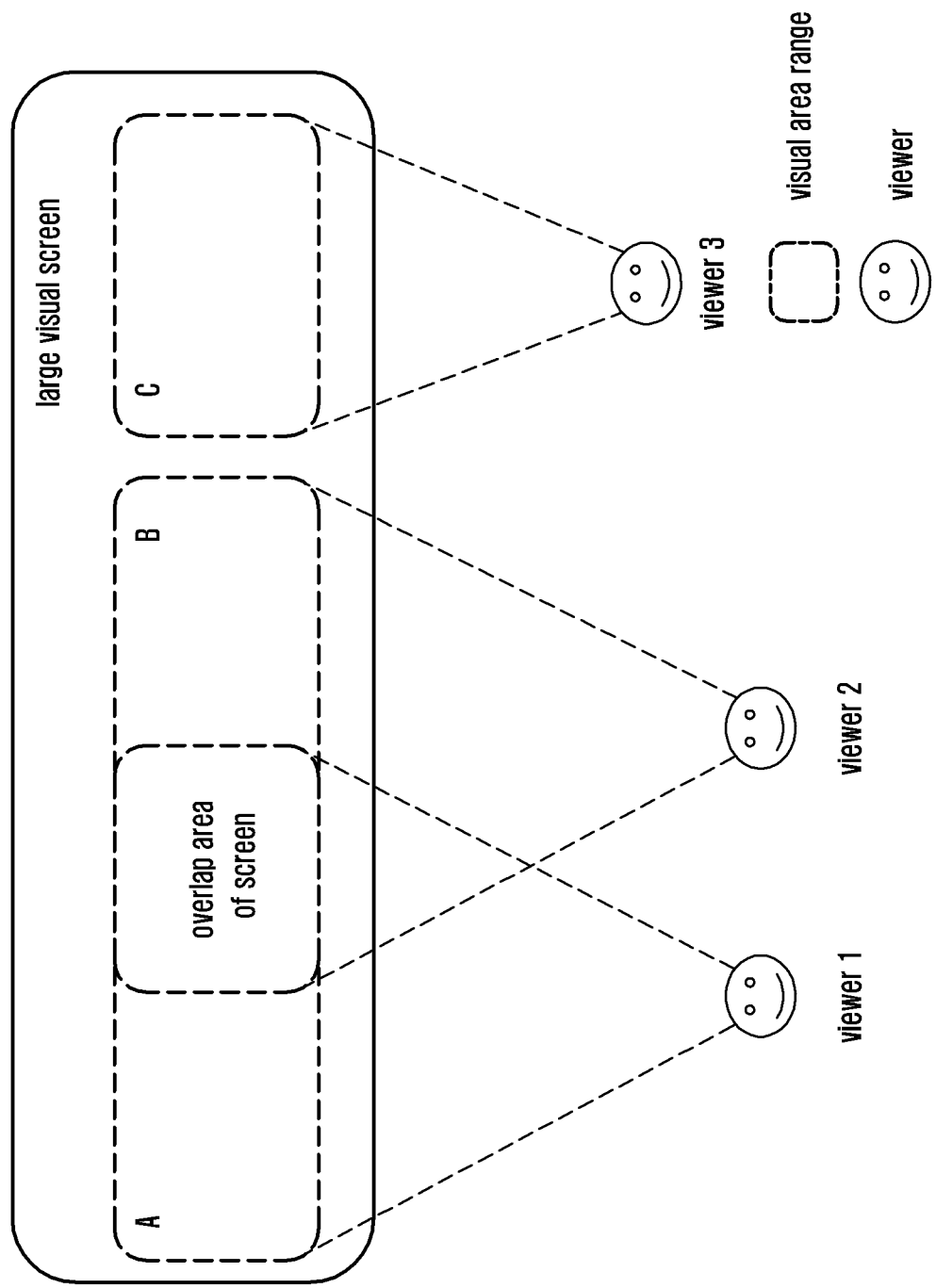
FIG. 5 is a diagram of a method for performing automatic adjustment and optimization display for a visible area of a screen according to an embodiment of the disclosure.

FIG. 5 is a diagram of a method for performing automatic adjustment and optimization display for a visible area of a screen according to an embodiment of the disclosure.

Referring to FIG. 5, the method for automatically adjusting the size and layout of the visible area and performing optimization display based on the face recognition, human eye recognition and positioning of a target in this embodiment is shown, and a specific implementation is as follows.

1. According to the face recognition, human eye recognition and positioning of a target, the number and positioned positions of targets, the size of the visible area and a main focused area are determined. FIG. 5 is taken as an example, three target viewers are recognized, respectively labeled as viewer 1, viewer 2 and viewer 3, and their respective visible areas are shown in the figure.

2. It is determined whether to split the screen and how to split the screen according to the number of targets. When the position of a viewer changes, the size and layout of the visible area are adjusted according to the information of the target (i.e., the information of the viewer). As shown in FIG. 5, in an initial state, the viewer 1 corresponds to screen A, the viewer 2 corresponds to screen B, and the viewer 3 corresponds to screen C.

When the viewer 2 moves to the position of the viewer 3, because the position of the viewer 3 is closer to the screen, the size and layout of the visible area need to be adjusted correspondingly along with the shortening of the distance between the viewer and the screen, so as to maintain an optimal ratio between the size of the visible area and the distance to the user and provide the user with the best viewing experiences.

3. The position of the visible area has a follow-up characteristic, and needs to move along with the movement of the user's position, so that the visible area is always at a best viewing position of the user. When the viewer moves to cause the overlap of screen, for example, when the viewer 1 moves to the viewer 2 to cause the overlap of screen in FIG. 5, the screen fusion processing strategy in Table 1 is used for processing.

TABLE 1

| Movement | Screen fusion solution |
| --- | --- |
| viewer 1->2, and viewer 2 remains still | screen B keeps a display state, and screen A disappears |
| viewer 2->1, and viewer 1 remains still | screen A keeps a display state, and screen B disappears |
| viewer 1->2, and viewer 2->1 | a screen corresponding to a slower moving viewer keeps a display state, viewer 1 and viewer 2 are recognized as concentrated multiple targets, and the size and layout of the screen are adjusted |
| viewer 2->3, and viewer 3 remains still | screen C keeps a display state, and screen B disappears |
| viewer 3->2, and viewer 2 remains still | screen B keeps a display state, and screen C disappears |
| viewer 2->3, and viewer 3->2 | a screen correspondign to a slower moving viewer keeps a display state, viewer 2 and viewer 3 are recognized as concentrated multiple targets, and the size and layout of the screen are adjusted |

4. For the viewers 1 and 3 in FIG. 5, the information including first-adapted optimal viewing distance of the user and the size and layout of the visible area is recorded. When the viewer 1 or 3 are recognized next time, the optimal distance most suitable for viewing or operating by the viewer 1 or 3, and the size and layout of the visible area are directly recommended according to the recorded information corresponding to the viewer.

A third embodiment: the automatic adjustment of UI of a small display device, such as a mobile phone or a refrigerator.

A specific implementation of this embodiment is as follows.

1. According to the face recognition, human eye recognition and distance positioning of a target, the identity information and device usage habits information of the user are recorded, and the display of the UI is adjusted correspondingly according to the recorded information.

Figure 6:
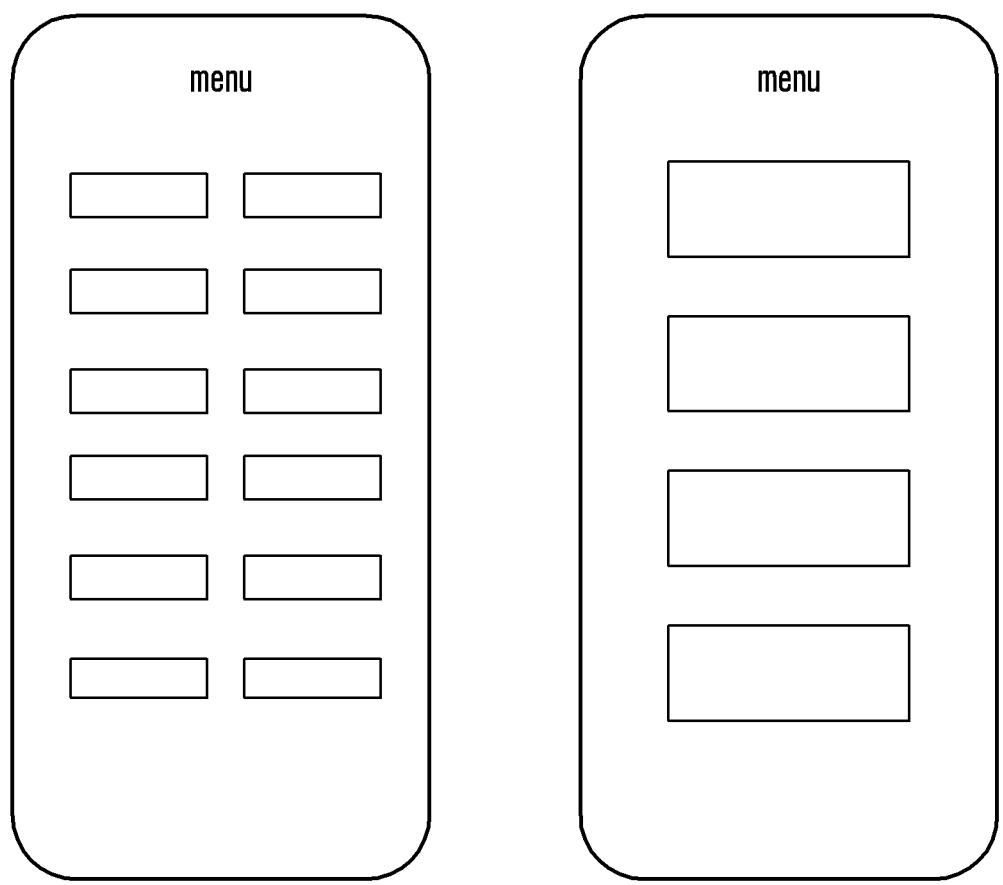
FIG. 6 is a diagram of a method for performing optimization display according to usage habits of user according to an embodiment of the disclosure.

FIG. 6 is a diagram of a method for performing optimization display according to usage habits of user according to an embodiment of the disclosure.

Referring to FIG. 6, for example, some users are accustomed to viewing mobile phones from a long distance or some users have poor eyesight. In this case, the UI should be displayed in a larger size to facilitate viewing, as shown in a menu interface of a device on the right of FIG. 6. Some users are accustomed to using mobile phones within a close range, the UI should be displayed reasonably, so as to display as much content as possible on one screen while ensuring that the user can see it clearly, as shown in a menu interface of a device on the left of FIG. 6.

2. When the device is used for the first time, the size and layout of the UI may be recommended according to the obtained position information of the user, or may be set according to a user-defined method.

3. When the device is used again, the habit information of using the UI by users is obtained according to the identity recognition of the user to present the most comfortable UI to each user, thereby improving the experiences of human-computer interaction.

4. The device may also reasonably prompt the user to zoom in or out according to the distance information of the user to protect eyesight of the user.

A fourth embodiment: the optimization display of a large TV (such as Samsung "The Wall TV").

Figure 7:
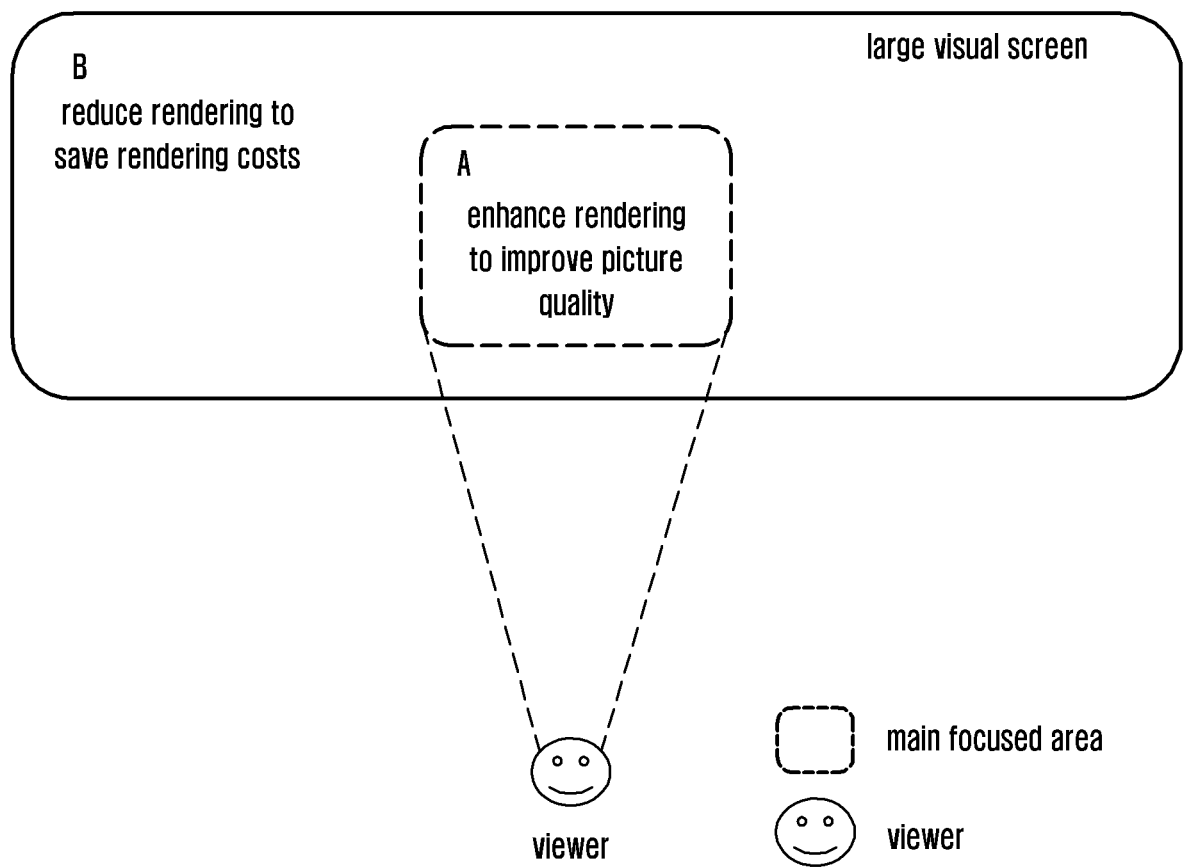
FIG. 7 is a diagram of optimization display of a large display device according to an embodiment of the disclosure.

FIG. 7 is a diagram of optimization display of a large display device according to an embodiment of the disclosure.

Referring to FIG. 7, a specific implementation of this embodiment is as follows.

For a large visual screen, it is recognized first according to an area focused by human eyes that a main focused area of the user is area A, and then rendering quality is enhanced for a picture in the area A, and rendering quality is reduced for a non-focused area B other than the area A.

Through the above rendering processing, not only the picture quality of the focused area of the user can be improved, but also the overall rendering costs can be reduced.

A fifth embodiment 5: the experiences of convenient human-computer interaction of a large TV (such as Samsung "The Wall TV").

Figure 8:
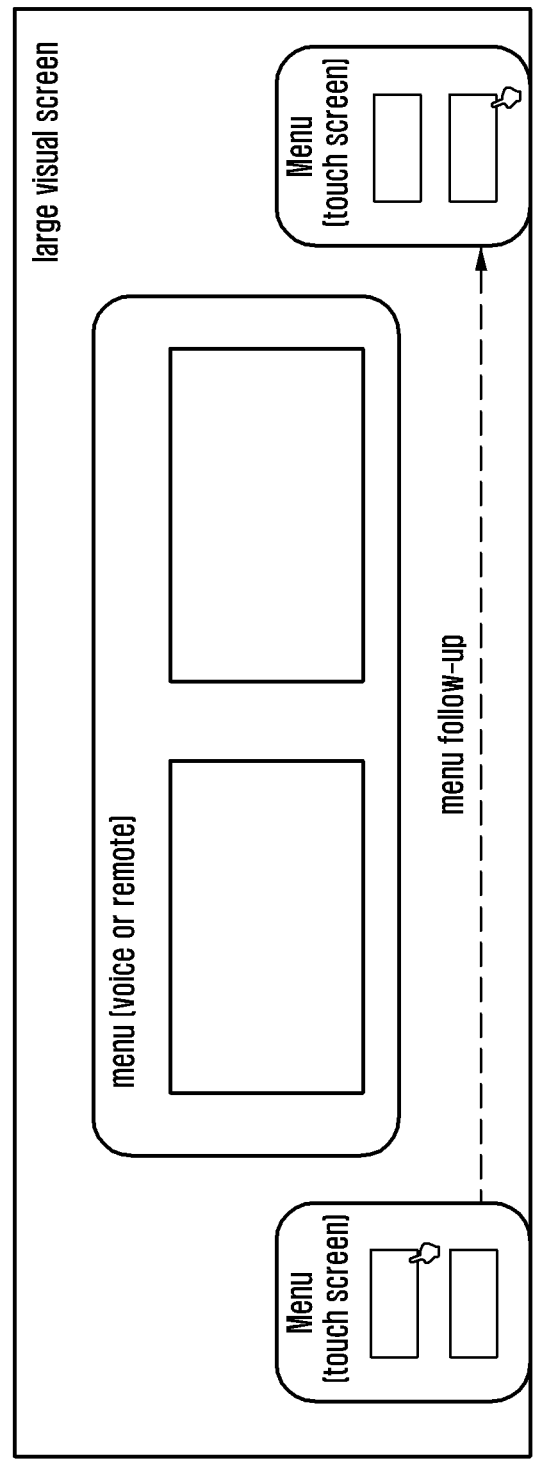
FIG. 8 is a diagram of human-computer interaction of a large display device according to an embodiment of the disclosure.

FIG. 8 is a diagram of human-computer interaction of a large display device according to an embodiment of the disclosure.

Referring to FIG. 8, for a large display device, such as Samsung "The Wall", the entire wall is a TV screen, and thus human-computer interaction modes may be diversified. A specific implementation is as follows.

1. When the user operates the TV at a remote place, the TV may be controlled by a voice or remote control equipment. At this case, the size of the menu UI may be increased (as shown in the middle part of FIG. 8) in this embodiment of the disclosure, so that the menu UI is displayed in a larger size to facilitate viewing and operating by the user.

2. When the user uses a touch screen to operate the menu within a close range, it would not be appropriate if the menu UI still maintains the original size as shown in the middle part of FIG. 8. At this case, the smart device in this embodiment adaptively adjusts the size and layout of the UI according to the position and height information of the user. For example, the smart device reduces the size of the menu UI and displays the menu UI at the bottom left corner or bottom right corner of the screen to ensure the friendliness and convenience of human-computer interaction.

3. The menu UI provided in this embodiment has a follow-up characteristic, and thus the position of the menu UI may change along with the movement of the user's position. In this way, the UI always can be reached by the user, thereby facilitating operations of the user and increasing the experiences of human-computer interaction.

The solution for automatically adjusting the size and layout of the visible area and performing optimization display based on the face recognition, human eye recognition and positioning of a user provided by the disclosure is different from the solution of the related art for displaying the visual area of a screen fixedly or displaying a part of the visual area fixedly. In the disclosure, the optimal visible area of the user can be obtained according to the face recognition, human eye recognition and positioning information of the user, and the size of the visual area can be adjusted to be consistent with the optimal visual range. When the size of the visual area changes, not only the size of the UI is adjusted to follow the change of the size of the visual area, but also the layout of the UI is adjusted correspondingly, thereby ensuring the friendliness and convenience of human-computer interaction.

Further, in the disclosure, through distinguishing a single user, centralized multiple users and scattered multiple users, the centralized multiple users are regarded as a whole to determine the size of the visual area, and the scattered multiple users are recognized respectively and the whole screen is split reasonably. After the screen is split, different users may view the same video or different videos, and different sound sources may be distinguished by equipment, such as earphone. In the disclosure, the visual area and the UI have a follow-up characteristic, and can change along with the change of the user's position, thereby improving the experiences of human-computer interaction. For the screen fusion problem in the screen follow-up process, the disclosure provides a screen fusion solution. In addition, the smart device may save the set optimal distance between the user and the smart device and the size and layout of the visual area to make corresponding recommendations for different users, so that each user can achieve the best viewing experiences. According to a human eye recognition algorithm, the size of the focused area of the user can be obtained, the rendering quality is enhanced for the focused area of the user, and the rendering quality is reduced for other areas, which can improve a viewing effect and reduce overall rendering costs.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for performing automatic adjustment and optimization display for a visible area of a screen, the method comprising:
   determining position information of a viewer and of the screen according to a face recognition algorithm;
   determining an optimal visible area of the screen for the viewer according to a human eye field of view algorithm; and
   adjusting at least one of a size or a layout of a visible area of the screen according to the optimal visible area to obtain a size and layout of the visible area most suitable for viewing by the viewer,
   wherein the determining of the position information of the viewer and the screen according to the face recognition algorithm comprises determining, according to the face recognition algorithm, whether a single viewer is viewing the screen, at least two viewers are viewing the screen in a centralized position, or at least two viewers are viewing the screen in non-centralized positions.

2. The method of claim 1, wherein the determining of the optimal visible area for the viewer according to the human eye field of view algorithm comprises:
   in a case where the at least two viewers are viewing the screen in the centralized position, positioning the centralized position of the at least two viewers, and determining the optimal visible area according to the positioned centralized position; and
   in a case where at least two viewers are viewing the screen in the non-centralized positions, splitting the screen, so that each viewer corresponds to respective split screen, and determining an optimal visible area in each split screen for a viewer corresponding to the split screen.

3. The method of claim 2, further comprising:
playing same or different contents in the different split screens, and
providing sounds corresponding to the different contents through different sound playback devices.

4. The method of claim 3, further comprising:
determining a display position and layout of a user interface (UI) in the visible area according to the size and layout of the visible area, so that the UI is suitable for operations by the viewer.

5. The method of claim 4, further comprising:
adjusting the display position and layout of the UI according to position movement of the viewer, so that the UI is suitable for operations by the viewer.

6. The method of claim 3, further comprising:
for different viewers, saving information of an optimal distance between each viewer and the screen, and size and layout information of the screen; and
when it is recognized that the viewer is viewing the screen, recommending the optimal distance, and the size and layout information of the screen that correspond to the viewer to the viewer according to the saved information.

7. The method of claim 3, further comprising:
adjusting the size and layout of the visible area according to position movement of the viewer, so that the visible area is suitable for viewing by the viewer.

8. The method of claim 7, further comprising, in the case where the at least two viewers are viewing the screen, when the position movement of the viewer causes overlap of visible areas of different viewers, at least one of:
when a first viewer moves to a second viewer and the second viewer remains still, a split screen corresponding to the second viewer keeps display, and a split screen corresponding to the first viewer disappears on the screen; or
when the first viewer moves to the second viewer, and the second viewer moves to the first viewer, a split screen corresponding to a slower moving one of the first viewer or the second viewer keeps display, and a size and layout of the split screen keeping display is adjusted through taking the first viewer and the second viewer as the case where the at least two viewers are viewing the screen in the centralized position.

9. The method of claim 3, further comprising:
obtaining a focused area of the viewer in the screen according to a human eye focusing algorithm;
enhancing rendering quality in the focused area of the viewer; and
reducing the rendering quality in a non-focused area of the viewer.

10. A device for performing automatic adjustment and optimization display for a visible area of a screen, the device comprising:
a recognizing and positioning system; and
a visible area controlling system,
wherein the recognizing and positioning system is configured to determine position information of a viewer and of the screen according to a face recognition algorithm, and to determine an optimal visible area of the screen for the viewer according to a human eye field of view algorithm,
wherein the visible area controlling system is configured to adjust at least one of a size or a layout of a visible area of the screen according to the optimal visible area determined by the recognizing and positioning system to obtain a size and layout of the visible area most suitable for viewing by the viewer, and
wherein the recognizing and positioning system comprises at least one of:
a single-target positioning device configured to determine a face and position information of a single target viewer according to the face recognition algorithm,
a centralized multi-target positioning device configured to recognize at least two target viewers according to the face recognition algorithm, take the at least two target viewers as a whole target, and perform centralized recognition and positioning according to faces of the at least two target viewers in the whole target, or
a scattered multi-target positioning device configured to recognize at least two target viewers according to the face recognition algorithm, and determine the at least two target viewers as scattered target viewers.

11. The device of claim 10,
wherein the
single-target positioning device is further configured to:
determine an optimal visible area for the single target viewer according to the human eye field of view algorithm, and
provide the determined optimal visible area to the visible area controlling system,
wherein the centralized multi-target positioning device is further configured to
determine an optimal visible area for the at least two target viewers according to the human eye field of view algorithm, and
provide the determined optimal visible area to the visible area controlling system,
wherein the scattered multi-target positioning device is further configured to:
perform processing of the single-target positioning device and the centralized multi-target positioning device for each target viewer, and
provide a processing result to the visible area controlling system, and
wherein the recognizing and positioning system further comprises a focused area recognizing device configured to:
obtain a focused area of the target viewer according to a human eye focusing algorithm, and
provide a result to the visible area controlling system.

12. The device of claim 11, wherein the visible area controlling system comprises at least one of:
a follow-up playing area device configured to play in the visible area, and adjust the size and layout of the visible area according to the information provided by the recognizing and positioning system, so that the visible area is suitable for viewing by the viewer;
a follow-up User Interface (UI) menu device configured to display an UI in the visible area, adjust a display position and layout of the UI according to the information provided by the recognizing and positioning system, so that the UI is suitable for operations by the viewer;
a picture enhancing area device configured to enhance rendering quality in a focused area of the viewer according to the information provided by the recognizing and positioning system;
a picture reducing area device configured to reduce the rendering quality in a non-focused area of the viewer according to the information provided by the recognizing and positioning system; or a screen splitting device configured to:
   split the screen according to the information provided by the recognizing and positioning system, so that each viewer corresponds to respective split screen, and
   determine an optimal visible area in each split screen for a viewer corresponding to the split screen.

\* \* \* \* \*